Patented June 21, 1932

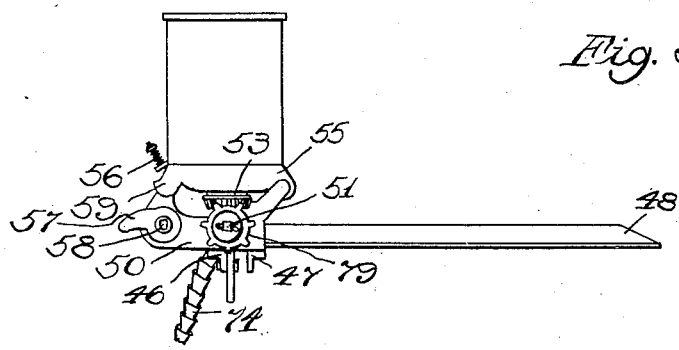

1,864,280

UNITED STATES PATENT OFFICE

ARTHUR A. SCARLETT, OF HAMILTON, ONTARIO, CANADA, ASSIGNOR, BY MESNE ASSIGNMENTS, TO INTERNATIONAL HARVESTER COMPANY, OF CHICAGO, ILLINOIS, A CORPORATION OF NEW JERSEY

PLANTER ATTACHMENT FOR CULTIVATORS

Application filed September 17, 1930. Serial No. 482,515.

This invention relates to a combined cultivator and planter. More specifically, it relates to a planter unit adapted to be removably attached to a cultivator.

The principal object of the invention is to provide a simple, compact planter assembly, which may be readily attached to and removed from a cultivator.

Another object is to provide means for driving the planter mechanism from the cultivator wheels.

Another object is to provide seed depositing means adapted to be attached to the cultivator shovels.

These objects and others, which will be apparent from the detailed description to follow, are accomplished by the provision of a supporting frame on which a plurality of planter units are mounted. The supporting frame is provided with means for removably attaching it to the frame of a cultivator. Seed depositing means are attached to the beams of the cultivator shovels, and flexible seed delivering tubes extend from the planter units to the seed depositing means.

In the drawings:

Figure 3 is a detail plan view of the planter assembly;

Figure 4 is a rear plan view of the planter assembly;

Figure 5 is an enlarged detail, showing the cultivator steering means; and,

Figure 6 shows a means for locking the steering means in position when the cultivator is used as a planter.

Figure 2:
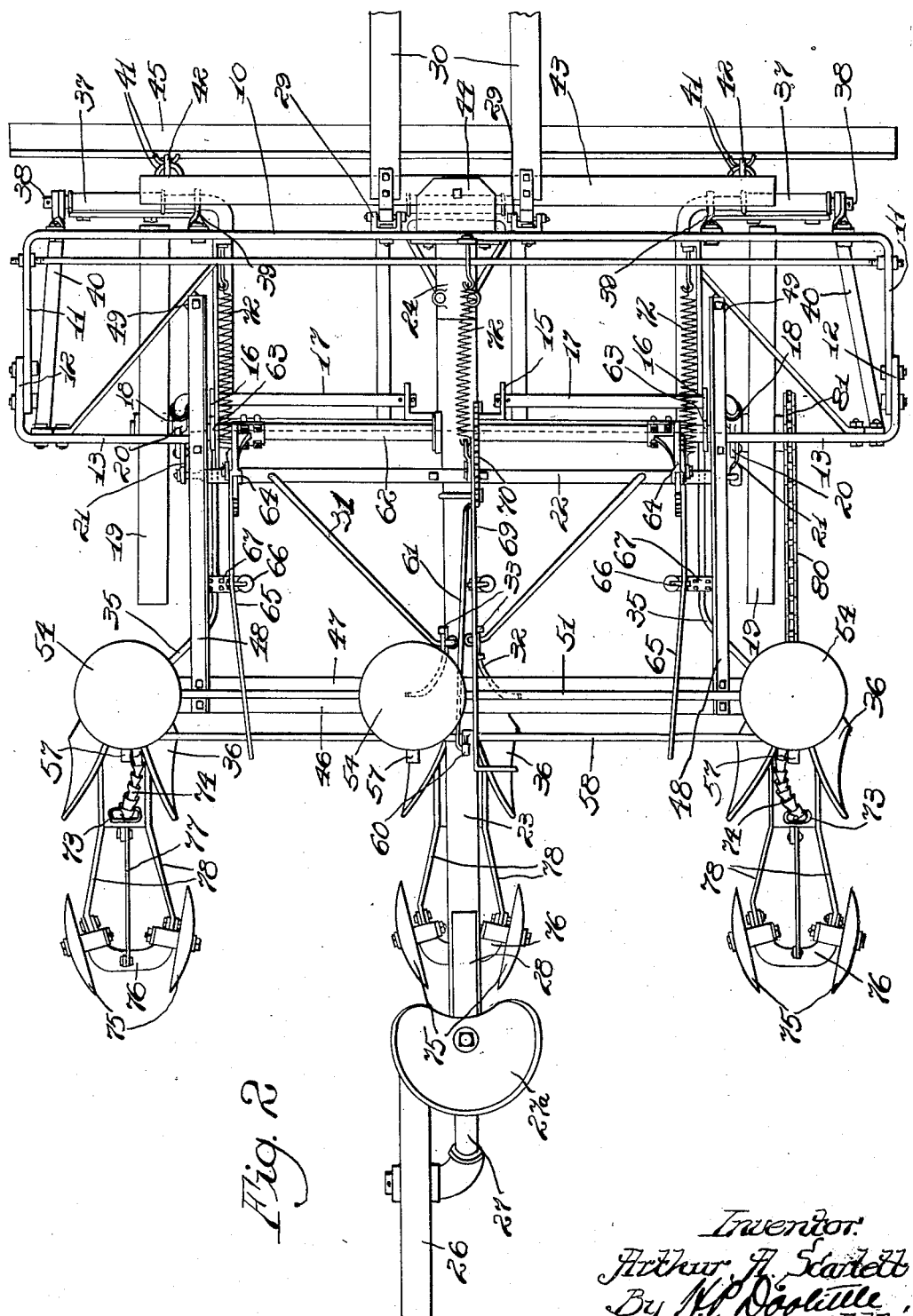
Figure 2 is a top plan view of the structure shown in Figure 1.

The frame structure of the cultivator is of a conventional construction comprising a plurality of bars rigidly secured together. As best shown in Figure 2, a forward bar 10 has rearward extensions 11 secured to forward extensions 12 on transverse, rearwardly positioned bars 13. The bars 13 are connected by a transversely extending angle bar 14. This rectangular framework together with braces constitute the frame structure of the cultivator.

A center bracket 15 having two forward extensions and a pair of brackets 16 are secured to the frame structure. The extensions on the bracket 15 and the brackets 16 are provided with aligned openings for receiving shafts 17. The shafts 17 are bent downwardly and are received in castings 18, to which stub axles are secured for mounting the wheels 19. The castings 18 have rearward extensions 20, to which upwardly and rearwardly extending bars 21 are rigidly attached. The castings 18 are rotatably mounted on the ends of the shafts 17 to provide for angling of the wheels. The upper ends of the bars 21 are pivotally connected by transversely extending bars 22 rigidly secured together.

A pipe 23 is secured at its forward end by a casting 24 and suitable attaching means to the forward bar 10 of the frame structure. The pipe 23 extends downwardly and rearwardly under the angle bar 14 at the rear of the frame structure and is provided at its rear end with a casting 25 rigidly attached thereto for pivotally supporting a caster wheel 26, which is mounted on an axle and supporting means 27. The upper end of said means is pivotally received in a vertical bore in the casting 25 in a conventional manner. A seat 27$^a$ is mounted, by means of a spring bar 28, to the casting 25.

A pair of spaced brackets 29 secured to the forward bar 10 provide means for pivotally attaching a pair of tongues 30. The tongues 30 are of a conventional construction and provide draft means for the cultivator and planter.

Figure 1:
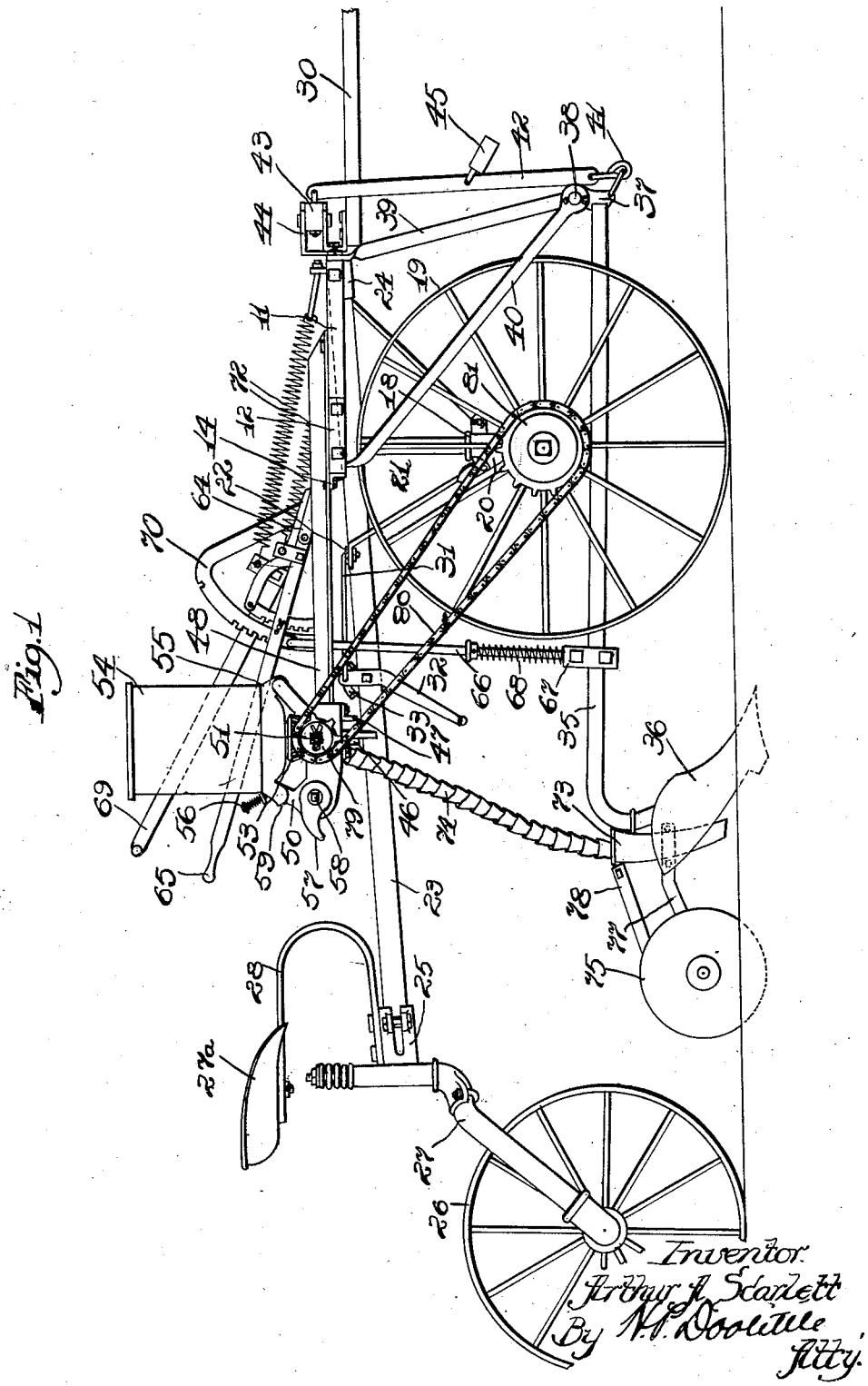
Figure 1 is a side elevation of a cultivator and planter attachment embodying the invention.

As shown in Figure 5, a pair of diagonally extending rods 31 are attached to the bars 22 and extend rearwardly where they are pivotally attached to foot levers 32. As best shown in Figure 1, the foot levers 32 are pivotally attached on brackets 33 secured to the pipe 23. It will be understood that by operating the foot levers 32, by applying pressure thereto, the bars 22 may be reciprocated transversely, whereby the wheels may be angled and the cultivator may be steered.

As shown in Figure 6, a U-shaped clamp 34 may be utilized for clamping around the pipe 23 and to the bars 22 for rigidly holding the wheels in position when it is not desired to steer the cultivator; for example, when the planting attachment is being used. Cultivator beams 35 carrying shovels 36 are rigidly secured to castings 37, which are provided with transverse bores for mounting on shafts 38. The shafts 38 are secured in upwardly extending bracing bars 39 and upwardly and rearwardly extending bracing rods 40. Chains 41 are also secured to the castings 37 for securing the lower ends of the vertical draft members 42. The draft members 42 are secured only to the outer castings 37 at each end of the frame structure. The upper ends of the members 42 are pivotally secured to the ends of a double-tree 43, which is pivotally attached at the center by means of a bracket 44 to the frame structure. A draft bar 45 extends transversely across the front of the cultivator and is pivotally attached to the draft members 42.

The supporting frame for the planter units comprises transversely extending angle bars 46 and 47 and forwardly extending bars 48 rigidly secured to the bars 46 and 47. The bars 48 are rigidly secured to the angle bar 14 of the frame structure and to brackets 49 secured to braces on the frame structure. Each of the planter units comprises a casting 50 mounted on the bars 46 and 47 and a conventional seed dispensing mechanism mounted on the casting and provided with means for driving the mechanism. A transversely extending shaft 51 extends through bearing surfaces provided in each of the castings 50 and provides means for simultaneously driving all of the seeding mechanisms. Bevel gears 52 mounted on the shaft 51 pivotally engage bevel gears 53 mounted beneath the hoppers 54 of the seeding mechanisms. The hoppers 54 are mounted on bases 55, which are pivotally attached at the forward sides for swinging forwardly. At the rear sides, spring pressed means 56 resiliently hold the hopper base in position. Cams 57 mounted on a rockshaft 58 extending through suitable bearings provided in the castings 50 are adapted to engage cam surfaces 59 provided on the hopper bases 55 for tilting the hoppers, whereby the gears 53 are raised out of engagement with the gears 52. A lever arm 60 is connected by a link 61 to the shovel lifting means, as will be hereinafter described.

A rockshaft 62 is mounted in bearing brackets 63 mounted in the bearing bracket 16 for rotation about a transverse axis. Lever brackets 64 are attached to each end of the rockshaft 62. The brackets are provided with quadrants and with lifting levers 65 pivotally attached thereto and adjustable along the quadrant. Rods 66 are pivotally attached to the lifting levers 65 and to brackets 67 secured to the cultivator beams 35. Springs 68 are mounted on the rod 66 in a conventional manner for spring pressing the beams 35 against the soil. At the center of the rockshaft 62 a lever 69 is rotatably secured for rocking said shaft. A quadrant 70 is rigidly attached to the frame structure and a detent mechanism of a conventional nature is provided on the lever 69 for rocking the rockshaft in different relative positions. The link 61 previously referred to is pivotally connected to the lever 69. Springs 72 are attached to each of the levers 65 and to the lever 69.

Seed depositing mechanisms are attached at the rear of each of the cultivating shovels 36 to the beams 35. A seed depositing shoe 73 is secured rigidly with respect to the downwardly extending portion of the cultivator beams 35. A flexible seed tube 74 extends from each of the planter mechanisms to one of the seed depositing shoes 73. The seed covering means are provided at the rear of the shoe 73 comprising disks 75 rotatably mounted on a carrying bracket 76. The bracket 76 is secured in position by a bar 77 attached to the seed depositing shoe and by bars 78 also attached to the seed shoe.

It will be understood from the description of this device that the cultivator is of a somewhat conventional construction. The beams 35 carrying the cultivating shovels are individually adjustable as to depth by means of the rockshaft 62, which is adjusted by the lever 69 and by means of the independent adjustments of the two outside shovels by means of the levers 65. The wheels 19 are steerable by the means described in detail by the application of pressure by the operator to the foot levers 32.

When it is desired to use the cultivator as a planter, the steering mechanism is locked by the use of the U-shaped clamp 34 shown in Figure 6. The planter supporting frame is mounted on the frame structure of the cultivator by attaching the forwardly extending bars 48. The shaft 51, which drives the seeding mechanisms, is provided at one end with a sprocket 79, which is connected by a chain 80 to a sprocket 81 mounted on one of the wheels 19. Seed from the planting mechanisms is delivered to the tube 74 and deposited by the shoe 73 behind the shovels 34, which make furrows for said seeds. The covering disks 75 are set to turn back sufficient soil over the furrow to cover the grain to the desired depth. It will be understood that, with an attachment of this kind, a cultivator of this type is readily convertible to a planter, by the attachment of the planter supporting frame, the seed depositing shoes and the driving chain. The planter attachment may be applied to planters of other types than that shown in the drawings. It is to be understood that applicant has shown only a preferred embodiment of his device and that he claims as his invention all modifications falling within the scope of the appended claims.

What is claimed as new is:

1. A planter attachment for cultivators having a substantially horizontal wheel supported frame structure and a plurality of cultivating units connected to trail behind said frame, comprising a transversely extended supporting frame having a plurality of planter units mounted thereon in spaced relation to the cultivating units, means for removably attaching said frame to the cultivator frame structure in overhanging relation to the cultivating units including forwardly extending horizontal members clamped to the cultivator frame, seeding mechanisms operatively associated with the planter units, means attached to said mechanisms and to one of the cultivator wheels for driving said mechanisms, seed depositing shoes mounted on the cultivating units, and a flexible seed delivery tube leading from each planter unit to one of the shoes.

2. A planter attachment for cultivators having a substantially horizontal wheel supported frame structure and a plurality of spaced shovels located rearwardly of said frame and mounted on beams pivotally attached to the frame structure, comprising a transversely extended supporting frame having a forwardly extending arm at each end the forward end of which is removably attached to the cultivator frame structure, a plurality of planter units mounted on said supporting frame substantially in alignment with the cultivator shovels, seeding mechanisms operatively associated with the planter units, seed depositing means mounted behind each shovel whereby the shovel forms furrow opening means, and means to deliver seed from the seeding mechanism to the depositing means.

In testimony whereof I affix my signature.

ARTHUR A. SCARLETT.